United States Patent
Romer et al.

(10) Patent No.: US 11,504,708 B2
(45) Date of Patent: Nov. 22, 2022

(54) PIPETTING DEVICE FOR AN IMPROVED PULSE-BASED PIPETTING OF LIQUID

(71) Applicant: Hamilton Bonaduz AG, Bonaduz (CH)

(72) Inventors: Hanspeter Romer, Hinwil (CH); Reto Ettinger, Uster (CH); Fridolin Gysel, Adliswil (CH); Jürg Rast, Schmerikon (CH); Jonas Hilti, Zürich (CH)

(73) Assignee: HAMILTON BONADUZ AG, Bonaduz (CH)

( * ) Notice: Subject to any disclaimer, the term of this patent is extended or adjusted under 35 U.S.C. 154(b) by 516 days.

(21) Appl. No.: 16/469,911

(22) PCT Filed: Dec. 11, 2017

(86) PCT No.: PCT/EP2017/082249
§ 371 (c)(1),
(2) Date: Jun. 14, 2019

(87) PCT Pub. No.: WO2018/108825
PCT Pub. Date: Jun. 21, 2018

(65) Prior Publication Data
US 2019/0358626 A1    Nov. 28, 2019

(30) Foreign Application Priority Data

Dec. 15, 2016 (DE) ..................... 10 2016 225 209.7

(51) Int. Cl.
*B01L 3/02* (2006.01)
*G01F 11/02* (2006.01)

(52) U.S. Cl.
CPC .......... *B01L 3/0268* (2013.01); *B01L 3/0265* (2013.01); *G01F 11/029* (2013.01);
(Continued)

(58) Field of Classification Search
None
See application file for complete search history.

(56) References Cited

U.S. PATENT DOCUMENTS

| 4,526,046 | A | 7/1985 | Oberli |
| 6,499,515 | B2 | 12/2002 | Sander |

(Continued)

FOREIGN PATENT DOCUMENTS

| CN | 1603009 A | 10/2004 |
| DE | 100 22 398 | 11/2001 |

(Continued)

OTHER PUBLICATIONS

Machine translation of WO 2017/017084 A1 to Romer et al. (Year: 2017).*

(Continued)

*Primary Examiner* — Matthew D Krcha
*Assistant Examiner* — Brittany I Fisher
(74) *Attorney, Agent, or Firm* — Tollefson IP

(57) ABSTRACT

A pipetting apparatus and method for pulsed dispensing of small metered-liquid doses of no more than 1 µl. The apparatus includes a pipetting conduit at least partly filled with working gas, a pressure-modifying apparatus for modifying the pressure of the working gas, and a control apparatus for applying control to the pressure-modifying apparatus. The control apparatus can control the pressure-modifying apparatus so as to generate in the pipetting conduit, with respect to a reference holding pressure in the pipetting conduit which is necessary for immovable holding of the metered-liquid quantity, an overpressure pulse having a pulse duration of no more than 40 ms.

9 Claims, 6 Drawing Sheets

(52) U.S. Cl.
CPC . *B01L 2200/146* (2013.01); *B01L 2300/0663* (2013.01); *B01L 2300/14* (2013.01); *B01L 2400/02* (2013.01); *B01L 2400/0478* (2013.01); *B01L 2400/0487* (2013.01); *B01L 2400/0633* (2013.01)

(56) References Cited

U.S. PATENT DOCUMENTS

| | | | |
|---|---|---|---|
| 6,662,122 B2 * | 12/2003 | Salje | B01L 3/0227 |
| | | | 702/50 |
| 8,900,530 B2 | 12/2014 | Wang et al. | |
| 2002/0011276 A1 | 1/2002 | Sander | |
| 2002/0131903 A1 | 9/2002 | Ingenhoven et al. | |
| 2005/0214172 A1 | 9/2005 | Burgisser | |
| 2005/0244303 A1 | 11/2005 | Ingenhoven et al. | |
| 2006/0071973 A1 | 4/2006 | Peeters | |
| 2008/0267828 A1 * | 10/2008 | Wang | B01L 3/0265 |
| | | | 422/400 |
| 2014/0056781 A1 * | 2/2014 | Jaaskelainen | B01L 3/0275 |
| | | | 422/501 |
| 2016/0074857 A1 * | 3/2016 | Li | B01L 3/0241 |
| | | | 422/509 |

FOREIGN PATENT DOCUMENTS

| | | |
|---|---|---|
| DE | 10 2008 016 549 | 10/2009 |
| DE | 10 2015 214 566 | 2/2017 |
| EP | 1 206 966 | 5/2002 |
| JP | 2002214244 A | 7/2002 |
| JP | 2004251820 A | 9/2004 |
| WO | 03078066 | 9/2003 |
| WO | 2017017084 | 2/2017 |

OTHER PUBLICATIONS

"Medizinische Laborgeräte und deren Verwendung" (Xu Jina, Zhang Boliang; Huazhong University of Science & Technology Press); Aug. 31, 2012.

International Search Report issued in PCT/EP2017/082249 dated Mar. 5, 2018.

German Search Report issued in DE 10 2016 225 209.7 dated Aug. 16, 2017.

Japanese Office Action dated Oct. 11, 2021, for Japanese Patent Application No. 2019-532141.

* cited by examiner

PIPETTING DEVICE FOR AN IMPROVED PULSE-BASED PIPETTING OF LIQUID

CROSS-REFERENCE TO RELATED APPLICATIONS

This application is the National Stage of International Application No. PCT/EP2017/082249, filed on Dec. 11, 2017, which claims the benefit of German Application No. 10 2016 225 209.7, filed on Dec. 15, 2016. The contents of both applications are hereby incorporated by reference in their entirety.

The present invention relates to a pipetting apparatus for pulsed dispensing, with the intermediary of a variable-pressure working gas, of small metered-liquid doses of no more than 1 μl from a larger metered-liquid quantity furnished in the pipetting apparatus, the pipetting apparatus encompassing:
- a pipetting conduit at least partly filled with working gas;
- a pressure-modifying apparatus for modifying the pressure of the working gas; and
- a control apparatus for applying control to the pressure-modifying apparatus, the control apparatus being embodied to apply control to the pressure-modifying apparatus so as to generate in the pipetting conduit, with respect to a reference holding pressure in the pipetting conduit which is necessary for immovable holding of the metered-liquid quantity, an overpressure pulse having a pulse duration of no more than 40 ms.

The present invention further relates to a method for pulsed dispensing from a pipetting tip, at a dispensed volume of no more than 1 μl for a single dispensing operation, of metered liquids received in the pipetting tip, encompassing the step of generating an overpressure pulse in a working gas that is connected in pressure-transferring fashion to the received metered liquid on a side facing away from a pipetting opening, so as thereby to detach a liquid droplet, on the side of the metered liquid facing toward the pipetting opening, from the latter and accelerate it away from the metered liquid.

The terms "overpressure pulse" and "pulsed dispensing" refer to an overpressure pulse having a total pulse duration of no more than 40 ms. The duration of the overpressure pulse here is the time span between departure from the reference holding pressure and return back thereto. The overpressure pulse is usually followed by a negative-pressure pulse of lower magnitude, so that the first return of the pressure of the working gas to the level of the reference holding pressure is a passage through the level of the reference holding pressure. In the case that is most often to be expected in reality, namely pressure oscillations in the working gas after generation of the overpressure pulse, what is meant above by the "return back" to the reference holding pressure is the first of, if applicable, several returns. Preferably both the overpressure pulse and the subsequent negative-pressure pulse are within the indicated time window of 40 ms. The duration of the negative-pressure pulse subsequent to the overpressure pulse is also to be measured between the first passage through the reference holding pressure level to the negative-pressure side, and the first return to the reference holding pressure level.

"Pulsed" dispensing refers to dispensing that deviates from the conventionally known pipetting mode, in which a pressure surge of working gas onto that side of the metered-liquid quantity received in the pipetting apparatus which faces away from a metering opening is exerted by the overpressure pulse of the working gas, so that that pressure surge propagates through the incompressible metered-liquid quantity to a pipetting-opening-proximal meniscus of the received metered-liquid quantity and results there in ejection of a metered-liquid droplet.

It is thereby possible to meter and in fact aliquot very small quantities of liquid—less than 1 μl or preferably even less than 600 nl—with high reproducibility.

In contrast thereto, with conventional dispensing the metered liquid received by the pipetting apparatus is pushed out by elevating the pressure in the working gas, until either a droplet detaches from the pipetting opening or metered liquid is metered through the pipetting opening onto a substrate wetted by the metered liquid or into a liquid that is already present, away from which the pipetting liquid is raised after delivery of the predetermined metered quantity.

Thus, whereas with conventional dispensing the pressure change in the working gas, and thus the motion of a pipetting piston, occur synchronously or quasi-synchronously with the delivery of metered liquid through a pipetting opening of the pipetting apparatus, the pulsed dispensing that is the basis of the present invention is asynchronous in this regard; in other words, upon pulsed, abrupt generation of an overpressure pulse in the working gas, the droplet of metered liquid as a rule is ejected from the received metered-liquid quantity only after the overpressure pulse has decayed or at least is in the process of decaying. Delivery of the metered-liquid droplet thus does not occur synchronously with a motion of the pipetting piston.

In pulsed dispensing, as a rule the quantities of liquid to be metered are delivered from the metered-liquid quantity received in the pipetting apparatus as droplets, with an acceleration that exceeds the acceleration of gravity generated by the Earth's gravitational field. This means that the metered droplets detached from the received metered-liquid quantity upon pulsed dispensing by the pipetting apparatus move away from the pipetting apparatus in the direction of gravity, in the context of dispensing, more quickly than merely in free fall.

Large quantities of metered liquid, i.e. quantities of more than 1 μl, as a rule are pipetted in a synchronous operating mode of the pipetting apparatus in which the metered liquid in the pipetting tip, more precisely in its meniscus facing toward the piston, synchronously follows the metering-side end surface of the piston. This means that when the piston is moved in a dispensing direction as a pipetting direction, the meniscus moves toward the pipetting opening of the pipetting apparatus together with the metering-side end surface of the piston and, when the piston is moved in an aspiration direction as a pipetting direction, moves away from the pipetting opening of the pipetting apparatus together with the metering-side end surface of the piston. A slight time offset can occur between the motion of the metering-side end surface of the piston and the meniscus of the metered liquid, since the working gas present between the piston and the metered liquid must firstly be brought, by the motion of the piston, to a pressure level at which the desired pipetting operation can proceed. In the context of aspiration this is a negative pressure with respect to ambient pressure, so that metered liquid, driven by the pressure difference between the pressure of the working gas and ambient pressure, flows into the pipetting tip from a metered liquid reservoir into which the pipetting opening of the pipetting tip is immersed. In the context of dispensing, the pressure is an overpressure with respect to ambient pressure, so that metered liquid received in the pipetting tip, driven by the pressure difference between the pressure of the working gas and ambient pressure, emerges through the pipetting opening of the pipetting tip. The compressible working gas thus acts like a gas spring. Because of the slight but real time offset between piston motion and the motion of the meniscus of the metered liquid in the pipetting tip, conventional pipetting of metered liquid will be referred to hereinafter as a "quasi-synchronous" operating mode.

In conventional dispensing with quasi-synchronous motion of the piston and metered liquid, inertial forces are used to produce detachment, from the pipetting tip, of the metered liquid being dispensed. The piston is moved for a predetermined time in a dispensing direction and then abruptly halted when a detachment of metered liquid displaced out of the pipetting tip is desired. The inertia of the previously displaced metered liquid, which is still moving in dispensing fashion because of the piston motion that has occurred, then causes the metered liquid to be pinched off at the pipetting opening, and ultimately causes it to detach. The correlation between the piston motion and the metered liquid displaced by the intermediary of the working gas is usually ascertained empirically for various classes of liquid and is stored in a data memory of the pipetting apparatus. In this quasi-synchronous operating mode, the volume (the pipetted volume in general or, depending on the motion direction of the piston, the aspirated volume or dispensed volume) swept out by the metering-side piston surface during the motion of the piston in a pipetting direction as a rule exceeds the actually pipetted volume of metered liquid by no more than 5%. The ratio between the pipetted volume and the metered-liquid volume that is actually pipetted is consequently as a rule no greater than 1.05.

As a result of the inertia-induced liquid detachment at the pipetting opening, metered liquid occasionally remains undesirably adhering to the exterior of the pipetting tip in the region of the pipetting opening. To prevent this adhering quantity of liquid from dropping off in entirely or partly uncontrolled fashion, the piston is moved a little way in an aspiration direction after liquid detachment in order to draw the externally adhering metered liquid through the pipetting opening back into the pipetting tip.

Depending on the particular metered liquid, this dispensing of metered liquid utilizing inertial forces no longer functions reliably for individual metered volumes of less than 3 to 5 µl, since, because of the small mass, the inertial forces that are achievable then can no longer overcome other influencing forces, in particular resulting from surface tension, with sufficient reliability to ensure dependable, repeatable detachment of such small metered-liquid quantities.

A distinction is to be made between the pipetting apparatuses recited above and so-called "dispensers," which as a rule can exclusively dispense metered liquid but cannot aspirate them. Dispensers, as a rule, obtain the metered liquid for dispensing via delivery conduits from a reservoir that is flow-capably connected to a metering space, variable by way of the piston, of the dispenser.

Also to be distinguished from the pipetting apparatuses recited above are pipetting apparatuses in which the metering-side end surface of the piston is directly in contact with the metered liquid to be pipetted. There is then no working gas present between the piston and the metered liquid.

Because of the direct motion coupling between the piston and metered liquid in such pipetting apparatuses, this type of pipetting is referred to among specialists as "positive displacement." The omission of compressible working gas increases the theoretically achievable pipetting accuracy, but in practice results in difficulties elsewhere. On the one hand, inclusion of gas in the pipetted volume upon aspiration cannot be ruled out with absolute certainty, so that bubbles of gas or air can occur in the aspirated metered liquid even with positive displacement pipetting; this has a disadvantageous effect on the achievable pipetting accuracy. On the other hand, the pipetting accuracy achievable with positive displacement pipetting is extremely low when the metered liquid has a tendency to foam. In addition, because the pipetting piston is wetted by the metered liquid, when the metered liquid to be pipetted is to be changed it is necessary to replace not just a pipetting tip but the pipetting piston as well, signifying a considerable installation outlay and consequently considerable costs.

In contrast thereto, the pipetting procedure used by pipetting apparatuses of the species, with a working gas between the piston and the metered liquid, is referred to among specialists as "air displacement," even though the working gas does not necessarily need to be air but can also be an inert gas or quasi-inert gas such as nitrogen. With this type of pipetting, the pipetting piston is permanently and completely separated from the metered liquid by a column of gas, in particular a column of air.

The present pipetting apparatus according to the present invention is also to be distinguished from those which use a column of a system liquid as a piston. A certain risk of contamination is associated with such system liquids, since at times it is not possible to exclude the possibility of system liquid, i.e. a portion of a "liquid column," from getting into the metered liquid being pipetted. In order to avoid a risk of contamination, the piston of the pipetting apparatus of the present invention is embodied at least locally, preferably completely, as a solid body. In the case of an embodiment only locally as a solid body, at least the metering-side end surface of the piston, facing toward the metered liquid, is embodied as a solid body in order to prevent a liquid-to-liquid transfer.

Pulsed dispensing as defined in the present invention is known from US 2001/0016358 A1. There, however, an overpressure pulse is not mediated by a working gas, but instead a physical impact is delivered by a piezoactuator directly onto the meniscus, located farther from the pipetting opening, of the metered liquid furnished in the pipetting apparatus; and as a result a droplet is ejected, at the opposite longitudinal end of the metered-liquid column that is furnished, from the meniscus located closer to the pipetting opening.

The disadvantages of this known method are obvious: contact between the metered liquid and the piezoactuator creates an elevated risk of contamination.

A pipetting apparatus of the species and a method of the species are described in German Patent Application 10 2015 214 566.2, which was unpublished at the time the present invention was filed.

Undesired accompanying phenomena can occur in the context of pulsed dispensing of small metered-liquid doses depending on the metered liquid selected, for example depending on its viscosity, density, and/or surface tension, and furthermore depending on the parameters of the overpressure pulse and, if applicable, of the subsequent negative-pressure pulse. For example, instead of only a single desired metered droplet at the delivering pipetting-opening-proximal meniscus, misting of the metered liquid or delivery of metered liquid by way of a metered droplet accompanied by undesired satellite droplets can occur; this is associated with an undesired decrease in the achievable metered-quantity accuracy.

The object of the present invention is therefore to describe a technical teaching that enables pulsed dispensing of small quantities of liquid with high reproducible accuracy.

This object is achieved according to the present invention by a pipetting apparatus of the kind recited previously in which the control apparatus is further embodied to apply control to the pressure modification apparatus, prior to generation of the overpressure pulse in the pipetting conduit with respect to the reference holding pressure, so as to generate a negative pressure.

As a result of the above-described embodiment of the control apparatus, the pipetting apparatus is capable in principle of moving a metered-liquid quantity received in the pipetting apparatus, which quantity as a rule is present as a metered-liquid column, a little way into the pipetting apparatus and away from a pipetting opening, prior to generation of the overpressure pulse. The result is that a gas volume can be furnished between the pipetting opening of the pipetting apparatus and a meniscus, located closer to the pipetting opening, of the metered-liquid quantity furnished in the pipetting apparatus.

The desired gas volume can always be generated by the above-described embodiment of the control apparatus, regardless of the manner in which the pipetting opening is furnished on the pipetting apparatus.

In experiments, it has been found that pulsed dispensing of a liquid droplet having a desired metered-liquid quantity, from a pipetting-opening-proximal meniscus of the metered-liquid quantity located within a receiving volume of the pipetting apparatus at a distance from the pipetting opening, is advantageous in terms of constituting a defined metered droplet.

The effects of retracting the metered-liquid quantity furnished in the pipetting apparatus away from the pipetting opening into a receiving space of the pipetting opening have not been entirely explained technically, but are phenomenologically reproducible.

It is possibly advantageous if the metered-liquid quantity, or at least the delivering pipetting-opening-proximal meniscus, of a metered-liquid column furnished in the pipetting apparatus is guided by side walls for the duration of droplet formation and delivery. Even a minimal motion of the entire metered-liquid column as a result of the overpressure pulse in the working gas thus takes place in a fluid-mechanically defined environment.

Conversely, if the delivering meniscus is located directly at the pipetting opening, its shape (for example its convexity or curvature) is undefined, and its deformation possibly caused by the overpressure pulse is less highly defined than in the context of the pipetting apparatus according to the present invention presented here.

Pulsed dispensing of metered liquid is possible in principle even when the delivering meniscus is located directly at the pipetting opening and, for example, wets the rim of the pipetting opening, but the operating parameters that must be established on the pipetting apparatus for a given metered liquid in order to achieve delivery of a desired small metered-liquid dose must then be selected within substantially narrower limits. In other words: because of the arrangement of the delivering meniscus of metered liquid furnished in the pipetting apparatus in a receiving space of the pipetting apparatus at a distance from the pipetting opening, the pulsed dispensing operation is less sensitive to external influences and modifications of operating parameters than if the delivering meniscus were located directly at the pipetting opening.

A further positive influence is possibly the fact that as a result of the application of control to the pressure modification apparatus so as to generate a negative pressure, and the associated displacement of the delivering pipetting-opening-proximal meniscus away from the pipetting opening, the lower meniscus becomes retracted into regions of the pipetting apparatus that were previously wetted by metered liquid, which is not necessarily the case, directly after aspiration of a metered-liquid quantity in order to furnish it in the pipetting apparatus, if the lower meniscus is present in an unpredictable shape directly at the pipetting opening. As a result of the retraction of the lower meniscus, or of the metered-liquid quantity that is furnished, farther into the pipetting apparatus, the delivering meniscus as a rule is present in a predictably defined shape that considerably improves the repeatability of the pulsed dispensing operation and its dispensing results.

The object recited previously is also achieved by a method of the kind recited previously which encompasses, before generation of the overpressure pulse, the following step:

with respect to the reference holding pressure in the pipetting conduit which is necessary for immovable holding of the metered-liquid quantity: generating a negative pressure in the working gas and thereby moving the received metered liquid away from the pipetting opening, accompanied by formation or enlargement of a gas volume between the metered liquid and the pipetting opening.

Regarding the advantages and effects of the method according to the present invention, reference is made to the statements regarding the pipetting apparatus according to the present invention, which describe the method for pulsed dispensing of metered liquid which is executable using the pipetting apparatus according to the present invention.

The advantage of the present invention is principally the capability for aliquoting doses of liquid with high reproducibility. For example, a metered-liquid quantity from 30 to 80 µl can be received in the pipetting apparatus, for example approximately 40 µl, of which approximately 500 nl is ejected as a metered droplet with each overpressure pulse. In experiments using 40 µl of glycerol received as a metered liquid at room temperature, 20 metered-liquid droplets were dispensed in succession in pulsed fashion, each having a target metered volume of 448 nl, and the inaccuracy of the metered-droplet volume over the 20 dispensing operations was less than 3%.

In order to ensure the advantages of the present invention in the context of aliquoting as well, in accordance with a refinement of the present invention provision can therefore be made that the control apparatus is embodied to apply control to the pressure modification apparatus, between the generation of two overpressure pulses that are each associated with a different one of two pulsed dispensing operations immediately successive to one another, so as to generate the reference holding pressure and then generate the negative pressure. The same correspondingly applies to the pipetting method according to the present invention, which can respectively encompass, between the generation of two different overpressure pulses that are nevertheless associated with directly successive pulsed dispensing operations, the steps firstly of generating the reference holding pressure that is necessary for holding the metered-liquid quantity received in the pipetting apparatus immovably in the pipetting apparatus, and then generating a negative pressure in the working gas with respect to the reference holding pressure and thereby displacing the pipetting-opening-proximal meniscus of the furnished metered liquid away from the pipetting opening into the pipetting apparatus, accompanied by formation of a gas volume between the metered liquid and the pipetting opening.

It should be added that the advantages referred to above in the context of pulsed dispensing of metered liquid, with the pipetting-opening-proximal meniscus being retracted away from the pipetting opening, are achievable both with pipetting conduits that taper conically toward the pipetting opening and with pipetting conduits that extend cylindrically with a constant cross section toward the pipetting opening. The conformation of the pipetting conduit in the region of the pipetting opening is thus not, or not particularly, important.

In order to achieve a maximally defined shape for the delivering meniscus, it is further advantageous if the aforementioned generation of the negative pressure encompasses generation of a first negative pressure, then generation of a pressure having a greater magnitude than the first negative pressure, and then generation of a second negative pressure. The higher pressure between the first and the second negative pressure is preferably higher than the reference holding pressure, so that the metered-liquid quantity furnished in the pipetting apparatus can be moved back and forth along a portion of the pipetting conduit by way of the above-described alternating modification of the working-gas pressure. As a result, at least a portion of the pipetting conduit can be repeatedly wetted by metered liquid.

According to an advantageous refinement of the present invention the method can accordingly encompass, after generation of the negative pressure but before generation of the overpressure pulse, the following further step:

elevating the pressure in the working gas and thereby moving the received metered liquid toward the pipetting opening.

The method can likewise encompass, after elevation of the pressure in the working gas but before generation of the overpressure pulse, the following further step:

generating a second negative pressure in the working gas and thereby moving the received metered liquid away from the pipetting opening, accompanied by formation or enlargement of a gas volume between the metered liquid and the pipetting opening.

Generation of the above-described second negative pressure ensures that the pipetting-opening-proximal delivering meniscus is arranged in the interior of the pipetting opening at a distance from the pipetting opening when the overpressure pulse is generated.

The second negative pressure does not necessarily need to be generated, but it is advantageous in terms of ensuring a desired location of the delivering meniscus at a distance from the pipetting opening. It can also be sufficient, however, to generate the first negative pressure, constituting an only negative pressure, for longer than the elevated pressure subsequent thereto, and/or to generate it with a quantitatively greater spacing from the reference holding pressure than the elevated pressure subsequent thereto. In that manner as well, it is possible to ensure that at the end of the preparatory pressure manipulation of the working gas prior to generation of the pulsed dispensing overpressure pulse, the delivering meniscus is located in the interior of the pipetting apparatus at a distance from the pipetting opening.

Although the pulsed dispensing overpressure pulse can be generated immediately after generation of the first negative pressure, after generation of the higher pressure, or after generation of the second negative pressure, it can nevertheless be advantageous firstly to allow the metered-liquid quantity furnished in the pipetting apparatus to "relax" before a pulsed dispensing operation. The control apparatus of the pipetting apparatus according to the present invention can therefore be embodied to apply control to the pressure modification apparatus, after generation of the negative pressure and before generation of the overpressure pulse, so as to generate the reference holding pressure. A corresponding refinement applies to the method according to the present invention.

Because the pressure of the working gas as a rule must compensate for the weight of the metered-liquid quantity furnished in the pipetting apparatus, if applicable minus friction effects and/or capillary effects against the wetted pipetting conduit walls, it is advantageous in terms of maximally accurate positioning of the delivering meniscus in the pipetting apparatus specifically in the context of aliquoting, in which the metered-liquid quantity furnished in the pipetting apparatus decreases with each pulsed dispensing operation, if the pipetting apparatus comprises a pressure sensor for detecting the pressure of the working gas, the pressure sensor being connected in signal-transferring fashion to the control apparatus for transfer of its detected information, the control apparatus applying control to the pressure modification apparatus in accordance with the information detected by the pressure sensor.

According to a corresponding refinement, the method can therefore encompass a detection of the pressure of the working gas; at least one pressure, from among a negative pressure, elevated pressure, reference holding pressure, and overpressure pulse, and if applicable a subsequent negative-pressure pulse, being generated depending on the detected pressure of the working gas and/or depending on an assumed furnished metered-liquid quantity. The assumed furnished metered-liquid quantity can be determined, for example by the control apparatus, based e.g. on a known initial metered-liquid quantity, by subtracting a dose quantity of a single pulsed dispensing operation multiplied by the number of pulsed dispensing operations that have occurred since provision of the initial metered-liquid quantity.

In principle, the pipetting apparatus can comprise a permanently installed pipetting conduit having a pipetting opening through which the metered liquid furnished in the pipetting apparatus is dispensed. This is less advantageous for hygienic reasons, however. The pipetting apparatus is preferably embodied to receive replaceable pipetting tips as part of the pipetting conduit. In accordance with an advantageous refinement of the present invention provision is correspondingly made that the pipetting apparatus comprises a coupling configuration, passed through by the pipetting conduit, for temporary attachment of a pipetting tip. Once a pipetting tip is attached to the coupling configuration, the pipetting tip prolongs the pipetting conduit that is inherent to the apparatus and is temporarily (i.e. for the time during which it is attached) part of the pipetting conduit of the pipetting apparatus. The pipetting tip is preferably a so-called "disposable," i.e. a single-use pipetting tip that is discarded after a single dispensing or aliquoting operation.

The pipetting apparatus is preferably embodied not only for pulsed dispensing but also for conventional aspiration, so that metered liquid can be furnished in the pipetting apparatus, in particular in a pipetting tip received thereon, by quasi-synchronous aspiration of metered liquid through the pipetting opening of the pipetting apparatus into a receiving space of the pipetting apparatus. The pipetting apparatus is preferably embodied both for pulsed dispensing in asynchronous mode and for conventional dispensing in quasi-synchronous mode, so that small metered-liquid quantities of less than 1 µl, for example down to a few tens of nanoliters, as well as large liquid quantities of several hundred microliters, are reproducibly dispensable with the pipetting apparatus according to the present invention. The switchover between asynchronous and quasi-synchronous mode is effected very simply by adjusting the pipetting piston speed using the control apparatus. With sufficiently slow piston acceleration and piston motion, both dispensing and aspiration occur quasi-synchronously. The values for piston acceleration and/or piston speed which are to be set can be ascertained, without great effort, by experiment for different classes of liquid.

For example, in order to implement a quasi-synchronous pipetting mode the control device can be embodied to move the piston at a peak speed of no more than 1000 µl/s in order to pipette a predetermined individual metered volume of more than 1 µl. At the indicated maximum piston speed of no more than 1000 µl/s, the metered liquid follows the piston in a codirectional motion (optionally with a slight time offset). The pipetting volume swept out by the piston corresponds substantially to the metered-liquid volume that is actually pipetted. The piston sizes recited above, indicated by way of piston area, once again preferably apply.

With the capability of operating the pipetting apparatus according to the present invention in both a synchronous and quasi-synchronous, as well as asynchronous, pipetting mode, a single pipetting apparatus according to the present invention can be embodied to reproducibly pipette a selectable individual metered volume in a metered-volume range from 100 nl to 100 µl, preferably from 100 nl to 1000 µl, with a volume discrepancy of no more than 2% in terms of the predetermined individual metered volume constituting a nominal volume. The pipetting apparatus according to the present invention is thus capable of pipetting a maximum pipetting volume that is 10,000 times the minimum pipetting volume. It is of course not to be excluded that, for example, the aforesaid lower limit of 100 nl can be even lower. Functionality of the pipetting apparatus is in any event ensured for the aforesaid pipetting volume range.

For the reasons recited, it is advantageous if the pipetting apparatus comprises a pipetting tip having a counterpart coupling configuration for releasable coupling engagement with the coupling configuration, and having a pipetting opening constituting a passthrough opening for metered liquid during an aspiration operation and during a dispensing operation. In this case the metered liquid is furnished in the pipetting tip, if applicable after an aspiration operation. The aspiration operation occurs not in pulsed fashion but instead as a quasi-synchronous aspiration operation, i.e. the generation of an aspirating negative pressure in the working gas, and an inflow caused thereby of metered liquid through the pipetting opening into the pipetting apparatus or into the pipetting tip, largely overlap in time.

One of the great advantages of the pipetting apparatus according to the present invention and of the dispensing method according to the present invention is that a standard pipetting tip, having a nominal pipetting space volume that is substantially larger than the metered-liquid dose delivered in the context of a single pulsed dispensing operation, can be used. The nominal receiving volume or nominal pipetting space volume of the pipetting tip is preferably more than 80 times, particularly preferably more than 300 times, most highly preferably more than 500 times as large as the minimum possible volume of a single liquid dose that is dispensed or dispensable in pulsed fashion. It is thereby possible to implement aliquoting operations with numerous successive pulsed dispensing operations, simultaneously with a very high reproducibility for the dose volume.

In an experiment, for example, a standard pipetting tip having a nominal receiving volume of 300 µl was temporarily attached to a pipetting apparatus. 40 µl of a metered liquid, for example glycerol, was aspirated into this pipetting tip. By way of the embodiment according to the present invention of the pipetting apparatus or by application of the method according to the present invention, a gas volume of 4 to 5 µl was provided between the delivering meniscus and the pipetting opening. With this configuration, glycerol was aliquoted as a metered liquid at a single-dose volume of 448 nl 20 times in succession, in which context the individually delivered metered volumes differed by no more than 2.96%.

Repeated delivery of glycerol, constituting a comparatively high-viscosity liquid, at a reproducible metered volume of less than 450 nl, from a 40-µl reservoir furnished in the pipetting apparatus, is highly unusual.

The critical factor for achieving this accuracy was the gas volume furnished between the delivering meniscus of the metered liquid and the pipetting opening prior to generation of the overpressure pulse, since experiments without a gas volume, i.e. with a delivering meniscus abutting directly against the pipetting opening, did not allow reproducible pulsed dispensing of glycerol at less than 450 nl. Without a gas volume between the pipetting opening and delivering meniscus, the minimum reproducible dispensed volume of glycerol was more on the order of 2 µl, i.e. more than four times the value achievable with a gas volume. Experiments so far conducted indicate that specifically with higher-viscosity liquids such as glycerol and the like, utilization of the present invention allows considerable progress to be made toward achieving reproducible small metered quantities when aliquoting from a larger reservoir in the pipetting apparatus.

The gas volume between the pipetting opening and delivering meniscus is preferably at least twice to four times the metered-liquid volume intended for pulsed dispensing. The gas volume should on the other hand, if possible, be no greater than 25 times, preferably no greater than 20 times, the metered-liquid volume provided for pulsed dispensing.

Specifically in the case of pipetting conduits and pipetting tips that taper conically toward the pipetting opening, an increasing distance between the delivering meniscus and the pipetting opening results in an area thereof that becomes progressively larger. A limit on the enlargement of the surface area of the pipetting-opening-proximal meniscus is encountered when gas bubbles enter the metered liquid furnished in the pipetting conduit through the lower meniscus. This situation should, of course, be avoided.

In physical terms, the use of conventionally sized pipetting tips having a nominal receiving volume of 100, 200, 300, or more microliters is possible by the fact that the pressure modification apparatus can comprise a magnetic piston and electrically energizable coils that interact therewith in order to move it along the pipetting conduit. The magnetic piston is preferably a solid piston having at least one, or preferably a plurality of, solid-state permanent magnets that preferably are sufficiently sealed at their longitudinal end, for example with corresponding caps, with respect to the pipetting conduit that movably receives the piston. Furnishing a magnetic piston drivable by an electromagnetic field makes possible highly dynamic piston motion processes in the pipetting conduit, and thus allows the generation of short-duration, whiplash-like overpressure pulses whose effect can be abruptly stopped by negative-pressure pulses of equally short duration.

Using magnetic pistons, it is possible to achieve piston accelerations in the pipetting conduit which are not attainable using conventional mechanical motion drive systems for pipetting pistons.

When the pressure modification apparatus encompasses, as is preferred, a magnetic pipetting piston and electrically energizable coils, the control apparatus is preferably embodied to control the energization of the coils. The aforementioned generation of a negative pressure then encompasses a displacement of the magnetic piston in a first direction, as a rule in a direction away from the metered-liquid quantity furnished in the pipetting apparatus.

Generation of the overpressure pulse also encompasses a displacement of the piston in a second direction opposite from the first and, immediately subsequently, in the first direction.

Preferably only the working gas, and no further system fluid or metered fluid, is present between the pipetting piston and the metered-liquid quantity furnished in the pipetting conduit.

Alternatively or additionally, however, the pressure modification apparatus can also be implemented by way of different working-gas pressure reservoirs, each of which is connectable in pressure-transferring fashion to the pipetting conduit via at least one valve. In this context, one working-gas pressure reservoir is an overpressure reservoir and the respective other one is a negative-pressure reservoir. The pressures (overpressure and negative pressure) are to be understood with respect to a reference pressure, for example a pressure in an expected reference holding pressure range, which is determined by the metered-liquid quantity usually furnished in the pipetting conduit.

In the application instance just recited, the control apparatus is then embodied to control an opening and closing of the respective valves; generation of a negative pressure encompassing an opening and a closing of the negative-pressure valve, and generation of an overpressure pulse encompassing an opening and a closing of the negative-pressure valve as well as an opening and a closing of the overpressure valve.

In the context of the preferred use of a pressure modification apparatus with a pipetting piston, the whip-like movability of the piston is preferably achieved by the fact that in order to dispense a predetermined individual metered volume of less than 1 μl, the control device is embodied to operate the motion drive system in such a way that the piston is moved in a dispensing direction and, in that context, its metering-side end surface sweeps out a dispensed volume that is no less than 1.4 times greater than the individual metered volume; and that the piston is then moved in an aspiration direction opposite to the dispensing direction and, in that context, its metering-side end surface sweeps out an aspirated volume, such that no more than 40 ms, preferably no more than 30 ms, elapses between the beginning of the control signal of the control device for driving the piston in a dispensing direction and the end of the control signal for driving the piston in an aspiration direction.

This aspect focuses on the control signal which controls the piston movement and which the piston follows, as a result of inertia, friction, and similar external influences, as a rule with a time offset and with a certain discrepancy between the actual piston motion and the target motion specified by the control signal. Applying control to a piston that follows the target motion with sufficient accuracy already results in the success according to the present invention described in detail below, and achieves the effects aimed at by the present invention.

With regard to the actual piston motion, a whip-like motion of the piston can be implemented by the fact that in order to pipette a predetermined individual metered volume of less than 1 μl, the control device is embodied to operate the motion drive system in such a way that the piston is moved from a starting position in a dispensing direction, in which context its metering-side end surface sweeps out a dispensed volume that is no less than 1.4 times as great as the individual metered volume; and that the piston is then moved, proceeding from a motion direction reversal location, in an aspiration direction opposite from the dispensing direction, in which context its metering-side end surface sweeps out an aspirated volume, such that no more than 40 ms, preferably no more than 30 ms, elapses between the points in time at which the piston respectively reaches, in a dispensing direction and in an aspiration direction, the location that corresponds to half the travel between the piston starting position and piston reversal location ("half-travel time" or "half-travel distance").

The second aspect, relating to the half-travel time, is in principle independent of the first aspect relating to the control signal that is used within a predetermined time to apply control to the piston. The first and the second aspect can also be implemented together in combination on one pipetting apparatus.

The result of utilizing the time required by the piston to travel, starting from the "half-travel distance" location—i.e. the midpoint of the distance between the piston starting position and the dead-center point, with a reversal in motion direction from the dispensing direction to the aspiration direction (motion direction reversal location)—to the dead-center point and back to the half-travel distance location, is to block out deviations of the actual piston motion from the target piston motion which are irrelevant to the dispensing operation and can occur, for example, in the form of overshoots toward the end of the piston motion upon return to a halt position. The overshoot that may occur can make it difficult to ascertain the actual piston halt at the end of a pulsed dispensing operation. But because, in accordance with experiments that have hitherto been carried out, the overshoot has no influence at all on the quantity of metered liquid dispensed, any detailed discussion of the motion behavior of the piston as motion comes to an end can be omitted. What is critical in terms of the dispensing success achieved by way of the whip-like piston motion is instead the aforementioned time span that the piston requires, during its motion in a dispensing direction from the location of the half-travel distance to the dead-center point of its motion and then, during its motion in an aspiration direction, in order to return to the location of the half-travel distance.

The motion of the piston can be detected on the basis of any reference point on the piston, for example based on the metering-side piston surface.

The effect of the motion sequence of the piston as proposed according to the present invention on the metered liquid has not yet been entirely clarified. One explanatory model assumes, however, that with the motion of the piston in a pipetting direction in excess of the predetermined individual metered volume that is to be pipetted, the excitation energy or breakaway energy necessary to initiate motion of the metered liquid in the desired dispensing direction, against inertial forces, surface tension, adhesion, and cohesion thereof, becomes transferred to the metered liquid that is to be pipetted.

With the motion of the piston in the aspiration direction opposite to the dispensing direction, in which motion the piston in turn as a rule sweeps out a different volume that is preferably greater than the individual metered volume that is actually to be pipetted, the previously excited dispensing motion of the metered liquid becomes "de-excited."

A very short, sharp pressure pulse is thus transferred from the piston via the working gas to the metered liquid.

Surprisingly, the volumes (dispensed volume and aspirated volume) swept out by the piston in the course of its motion can be identical in size. The piston can therefore be located back in the starting position at the end of the dispensing operation even though an individual metered volume is pipetted.

A "displacement profit" for the piston is therefore not of importance according to the present invention. Experiments have instead shown that the metered-liquid volume that is actually dispensed depends on the target piston motion integrated over time. The target piston volume can be indicated, for example, in the form of target locations of the piston along the conduit path at respective target points in time, i.e. by way of target location/time curves. Because the target piston motion depends on the control signal of the control device, the metered-liquid volume that is actually pipetted can depend on the time-related course, integrated over time, of the control signal. The metered-liquid volume that is actually pipetted can also depend on the actual piston motion integrated over time. Once again, the actual piston motion can be indicated in the form of actual locations of the piston along the conduit path at respective actual points in time, i.e. in the form of actual location/time curves. When the actual piston motion is used, the integration limits are the two passages of the piston through the half-travel distance location.

If one of the aforesaid variables that changes over time (target piston motion, control signal, actual piston motion) is therefore plotted as a graph against time, the area under the graphed line between motion onset and motion termination is an indication of the metered-liquid volume that is actually dispensed. When the actual piston motion is used as an evaluation variable for the dispensed metered-liquid volume, the relevant motion onset is the first passage through the location of the half-travel distance, and the relevant motion termination is the second passage through that location.

On the reasonable assumption that the shape of the metering-side end surface of the piston does not change during pipetting, the volume swept out by the piston or by its end surface is the planar area of the projection of the metering-side end surface onto a projection plane orthogonal to the conduit path, multiplied by the piston stroke length. Because at least the metering-side end surface of the piston is preferably embodied as a solid, this assumption is realistic.

The term "dispensing direction" refers to a motion direction of the piston which brings about an expulsion of metered liquid from a metered-liquid receiving space of the pipetting apparatus, for example from a pipetting tip. The term "aspiration direction" refers to a motion direction of the piston which causes metered liquid to be drawn into a metered-liquid receiving space of the pipetting apparatus.

For purposes of the present invention, an "individual metered volume" is predetermined whenever the dispensing operation proceeds with the objective of dispensing a specific, known metered volume. The individual metered volume can be predetermined by manual input into the pipetting apparatus or by data transfer to the pipetting apparatus or by calculation from manually inputted data, and/or data stored in a memory apparatus, for the pipetting apparatus.

The dispensed volume initially swept out by the metering-side end surface of the piston can depend not only on the predetermined individual metered volume, but additionally on parameters of the respective metered liquid to be pipetted and/or on the volume of working gas between the metering-side piston surface and the metered liquid. The principle is as follows: the higher the viscosity of the metered liquid (measured at a room temperature of 20° C. at an atmospheric pressure of 1013.25 hPa using a rotational viscometer), the higher the ratio between the dispensed volume and the individual metered volume. The following also applies: the greater the volume of the working gas, the higher the ratio of dispensed volume to individual metered volume. In the context of the preferred replaceable pipetting tips, a design-governed working-gas volume between the piston and the metered volume usually cannot be less than 100 µl and cannot exceed 3000 µl. The working-gas volume is preferably between 180 µl and 1000 µl, particularly preferably between 200 µl and 800 µl.

For example, the dispensed volume cannot be less than 1.5 times the individual metered volume. It can, however, also be appreciably larger than the single dispensed volume. It can be equal, for example, to five times the individual metered volume if a low excitation energy is sufficient to accelerate the metered liquid to flow through the (as a rule, narrow) pipetting opening. Metered liquids that are less readily excited to move can be excited to move using a piston motion in a dispensing direction, and a dispensed volume swept out in that context by the metering-side end surface, equal to no less than ten times the individual metered volume. Because the piston motion is executed preferably at a higher volumetric speed than the volume swept out per unit time by the metering-side end surface, the reproducibility for pipetting very small individual metered volumes (less than 1 µl) rises with increasing dispensed volume. The dispensed volume can therefore preferably be equal to no less than twenty-five times the individual metered volume.

Experiments have shown that in particular for the class of "aqueous liquids" that often need to be pipetted—i.e., for purposes of the present Application, liquids having a viscosity in the range from 0.8 to 10 mPas, measured at a room temperature of 20° at an atmospheric pressure of 1013.25 hPa using a rotational viscometer—a dispensed volume of between ten times and sixty times, preferably between ten times and twenty-five times, the individual metered volume produces outstanding metering results. A dispensed volume of between ten times and twenty-five times the individual metered volume also produces outstanding metering results for metered liquid outside the aforementioned viscosity range.

A upper limit on the dispensed volume is represented by a dispensed volume at which more than the individual metered volume becomes moved through the pipetting opening because of the long time span required by the piston to sweep out the dispensed volume with its metering-side end surface. Tests have shown that dispensed volumes of more than 100 times no longer permit useful dispensing of metered volumes of less than 1 µl.

Be it noted for clarification at this juncture that despite the above-described large piston motion in the context of dispensing, the pipetting apparatus embodied according to the present invention moves only the predetermined individual metered volume of metered liquid through its pipetting opening. Over-metering or over-dispensing, with subsequent correction in an aspiration direction, does not take place. According to the present invention, metered liquid is moved only in the desired dispensing direction during a dispensing operation. For purposes of the present Application, a dispensing operation is complete when piston motion in an aspiration direction ends.

The aspirated volume swept out by the piston during its motion can be identical to the dispensed volume, even in the context of aliquoting. In aliquoting mode, however, with an increasing number of dispensing operations the pipetting-opening-proximal meniscus can migrate farther and farther into a metered-liquid receiving space of the pipetting apparatus, which can be detrimental to the accuracy of further dispensing operations.

The aspirated volume can therefore be less than the dispensed volume by an amount equal to the individual metered volume. It is thereby possible to ensure that the pipetting-opening-proximal meniscus of received metered liquid remains in a maximally constant location even though several dispensing operations have been carried out. In accordance with the information provided previously, the aspirated volume can thus also be substantially larger than the individual metered volume.

It is also possible, however, firstly to return the piston, toward the end of the generation of the overpressure pulse, in an aspiration direction to its piston starting position at the beginning of the dispensing operation, and then to guide it back in a dispensing direction by an amount equal to the individual metered volume. The return guidance motion can then proceed considerably more slowly than the piston motion during the pulsed dispensing operation, and is no longer considered part of the dispensing operation itself.

The specific dispensed volume and aspirated volume to be swept out by the piston for a dispensing operation for dispensing small metered-liquid quantities can easily be determined by experiments using a defined individual metered volume.

According to the present invention, in contrast to the quasi-synchronous pipetting mode described above in connection with the existing art, an asynchronous pipetting mode is therefore used in which a significant portion of the piston motion no longer correlates with the motion of the metered liquid. Whereas with the quasi-synchronous pipetting mode described earlier there is only a small time offset between codirectional motions of the piston and the metered liquid, with the asynchronous pipetting mode described here, motions of the piston and metered liquid which are directed oppositely to one another can occur at a single point in time or within a single time span, or a motion of metered liquid through the pipetting opening can begin only after the piston has completed its motion in an aspiration direction and has come back to a halt.

Instead of drawing in and/or delivering metered liquid by way of comparatively slow piston motions, as previously, with the present pipetting apparatus a pressure pulse is generated in the compressible working gas by the rapid piston motion, and that pulse is transferred to the incompressible metered liquid and can result there in the segregation of small individual metered volumes out of a larger metered-liquid quantity. Because of the piston motion in a dispensing direction and in an aspiration direction, the aforesaid pressure pulse encompasses a leading edge and a trailing edge as compared with the ambient atmosphere. Upon aspiration the trailing pulse edge usually precedes the leading pulse edge in time, while in the context of dispensing it is exactly the reverse.

Regardless of when the individual metered volume of metered liquid begins to move through the pipetting opening in the context of a dispensing operation, it is nonetheless generally the case for most dispensing operations that upon dispensing, control is applied to the piston to reverse its direction of motion (and as a rule the direction of motion of the piston is in fact reversed) before the predetermined liquid volume has detached from the pipetting opening. Dispensing of a predetermined individual metered volume of less than 1 µl in jet mode can thereby be achieved.

According to an advantageous embodiment that is configured for dispensing individual metered volumes of less than 1 µl in jet mode, the control device can be embodied to apply control to the motion drive system, for a reversal of the direction of motion of the piston from the dispensing direction into the aspiration direction, before the predetermined liquid volume has detached from the pipetting opening. The predetermined liquid volume is then ejected out of the pipetting opening. This too is an expression of the whip-like piston motion.

With a sufficiently fast piston motion it can even happen that the piston motion in a dispensing direction and in an aspiration direction is entirely completed before the desired individual metered volume of metered liquid has moved completely through the pipetting opening. The piston speed can therefore also be an important influencing variable.

In a pipetting apparatus according to the present invention, the whip-like movability of the piston can consequently be produced by the fact that the motion drive system encompasses a linear motor; and that for pipetting a predetermined individual metered volume of less than 1 µl, the control device and the motion drive system are embodied to move the piston at a peak speed of at least 5000 µl/s, preferably at least 10,000 µl/s, and no more than 25,000 µl/s.

The motion speed of the piston is likewise characteristic of a whip-like piston motion. The volumetric speed of the piston, i.e. the volume swept out by the metering-side end surface of the piston per unit time, is more important here than the linear motion speed of the piston or of a piston rod. For pistons having a larger piston area, a shorter stroke length is sufficient to sweep out the same volume for which a piston having a smaller piston area would require a longer stroke length. In order to achieve increasing volumetric speeds, a piston having a larger piston area could therefore simply be moved along the conduit path, instead of a piston having a smaller piston area. The breakaway force required to initiate motion of the piston, for example in order to overcome static friction, rises considerably with piston size, however, so that for the dispensing of individual metered volumes of less than 1 µl, pistons having an increasingly large piston area are increasingly difficult to control.

The present invention preferably relates to pipetting apparatuses whose pistons have a piston area of between 3 and 80 mm$^2$, i.e. have a diameter of between 2 and approximately 10 mm assuming a circular piston area. In order to allow several pipetting conduits to be arranged in a row-and-column grid with the smallest possible grid spacing, the present invention particularly preferably relates to pipetting apparatuses whose pistons have a piston area of between 3 and 20 mm$^2$, corresponding to a diameter of between 2 and approximately 5 mm assuming a circular piston area.

Although dispensing at excessively high maximum piston speeds of, for example, more than 25,000 µl/s does still result in a motion of liquid out of a metered-liquid receiving space, the individual metered volume is then as a rule delivered as multiple broken-up or atomized sub-volumes, which is unacceptable for highly accurate dispensing of the small individual metered volumes of less than 1 µl under discussion here. In principle, it can be stated that with increasing piston speed, there is an increasing tendency for the predetermined metered-liquid quantity to be undesirably pipetted as multiple sub-quantities. As presently understood, at least for aqueous metered liquids as defined above, quite outstanding results in terms of the accuracy and repeatability of the pipetted liquid quantity are achieved at maximum piston speeds of approximately 10,000 µl/s.

In order to give an impression of the piston speed: the piston preferably requires less than 30 ms, by preference less than 20 ms, most highly preferably in fact less than 16 ms, to move in a dispensing direction and then in an aspiration direction from the half-travel distance location and then to return to that half-travel distance. Motion times in the single-digit millisecond range are in fact conceivable. The same is correspondingly true of the duration of the control signal, from the beginning of the control signal driving the piston in a dispensing direction until the end of the control signal driving the piston in an aspiration direction. Signal durations of as little as 1 ms for the control signal are possible, in order to pipette particularly small individual metered volumes.

Using a piston having a circular piston area and a diameter of 4.3 mm, with a pipetting volume of 30 µl swept out by the metering-side end surface and a counterpart swept-out volume of 29.05 µl, one complete piston motion in a dispensing direction and aspiration direction, with which a individual metered volume of 950 nl of an aqueous metered liquid is dosed, can easily occur in approximately 15 ms.

The kinematic aspect of the whip-like piston motion is based, however, not only on the maximum achievable piston speed but also on the length of time required by the motion drive system to accelerate the piston to the desired piston speed and/or decelerate it from the desired piston speed. The control device and the motion drive system are therefore preferably embodied to accelerate and/or decelerate the piston for motion along the conduit path with an acceleration of at least $2\times10^6$ µl/s$^2$, preferably at least $6\times10^6$ µl/s$^2$, particular preferably in fact at least $8\times10^6$ µl/s$^2$, and no more than $5\times10^7$ µl/s$^2$. The statements made above regarding preferred piston size, indicated as piston area, apply here.

Entirely surprisingly, it has furthermore been found that the pipetting of metered liquids, in particular of aqueous metered liquids, using the pipetting apparatuses according to the present invention which are proposed here, is independent of the particular pipetting tip used. With identical pipetting parameters and for a given metered liquid in a given pipetting apparatus, the same pipetting result is repeatably achieved using different pipetting tips. In particular, the pipetting result is independent of the nominal pipetting space volume of the particular pipetting tip attached to the pipetting apparatus.

The present invention will be explained in more detail below with reference to the appended drawings, in which.

Figure 1:
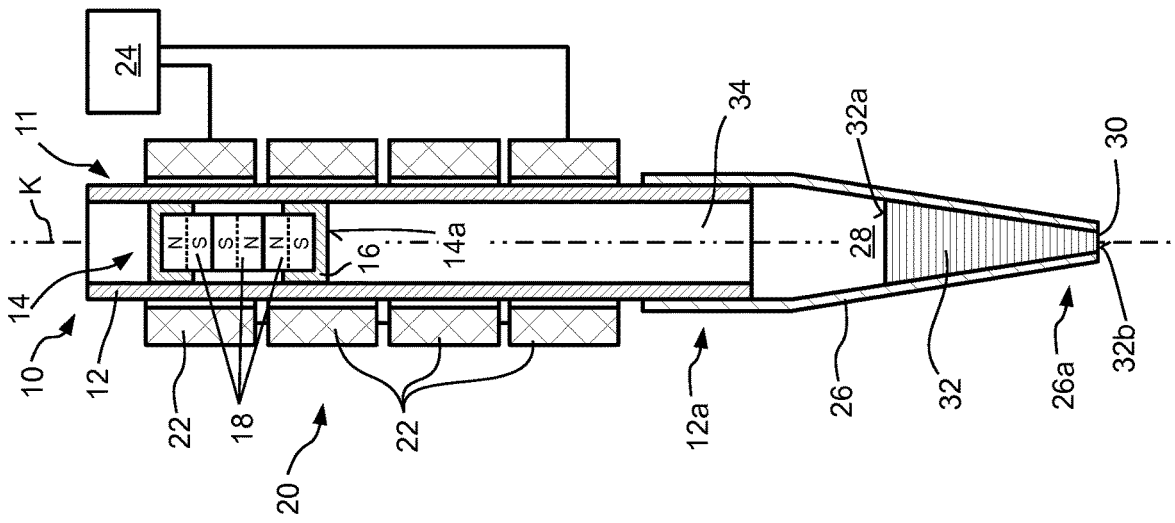
FIG. 1 shows a pipetting apparatus according to the present invention in which a pulsed dispensing method according to the present invention is executing, immediately after aspiration of a predetermined quantity of metered liquid.
Figure 2:
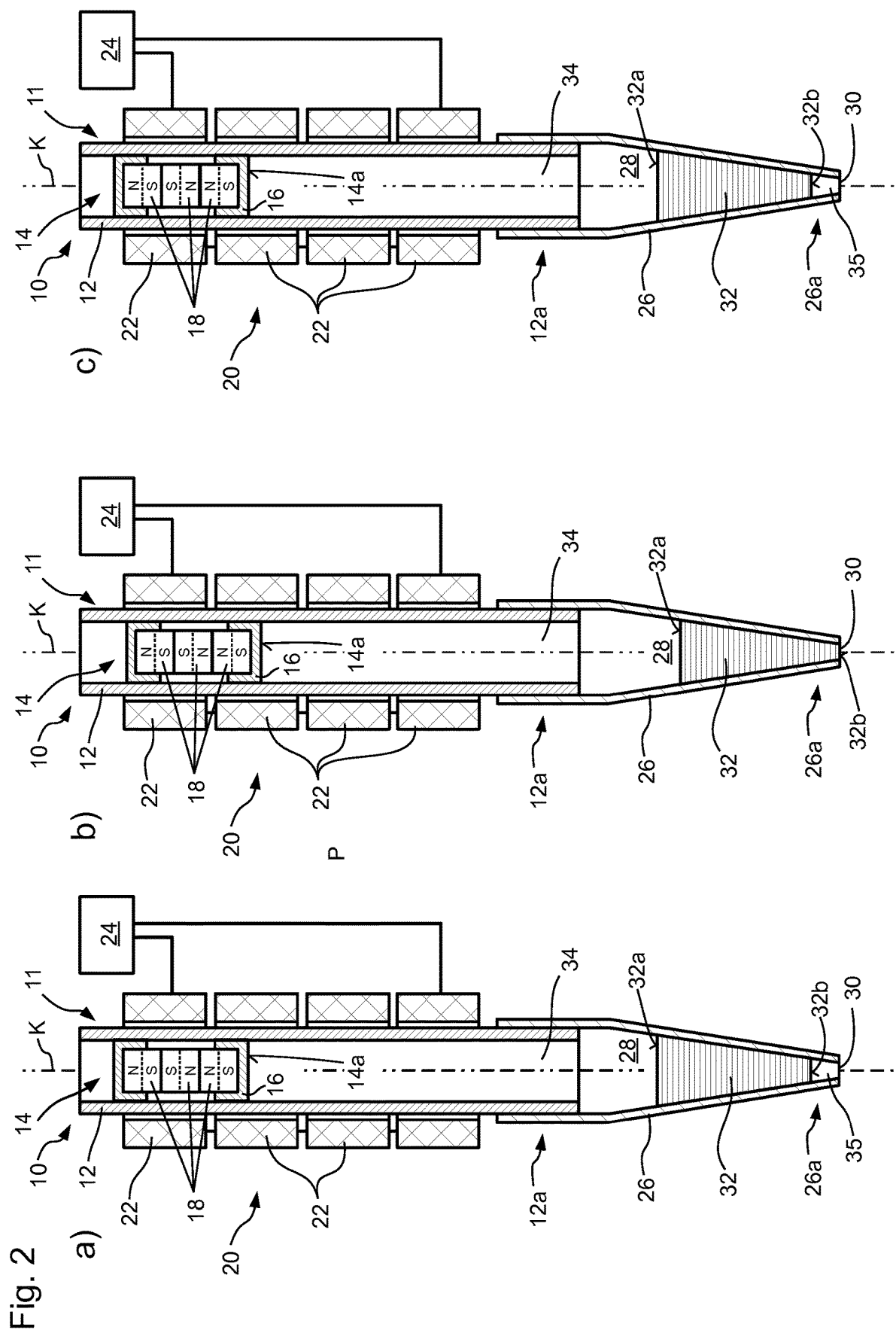
FIG. 2a shows the pipetting apparatus of FIG. 1 after generation of a first negative pressure in the working gas with respect to the reference holding pressure of FIG. 1, in order to form a gas volume between the pipetting opening and the aspirated metered liquid.
FIG. 2b shows the pipetting apparatus of FIG. 2a after the pressure of the working gas between the pipetting piston and aspirated metered liquid has been elevated in order to displace the pipetting-opening-proximal meniscus toward the pipetting opening.
FIG. 2c shows the pipetting apparatus of FIG. 2b after generation of a second negative pressure in the working gas with respect to the reference holding pressure of FIG. 1, in order to form a gas volume between the pipetting opening and the aspirated metered liquid.
Figure 3:
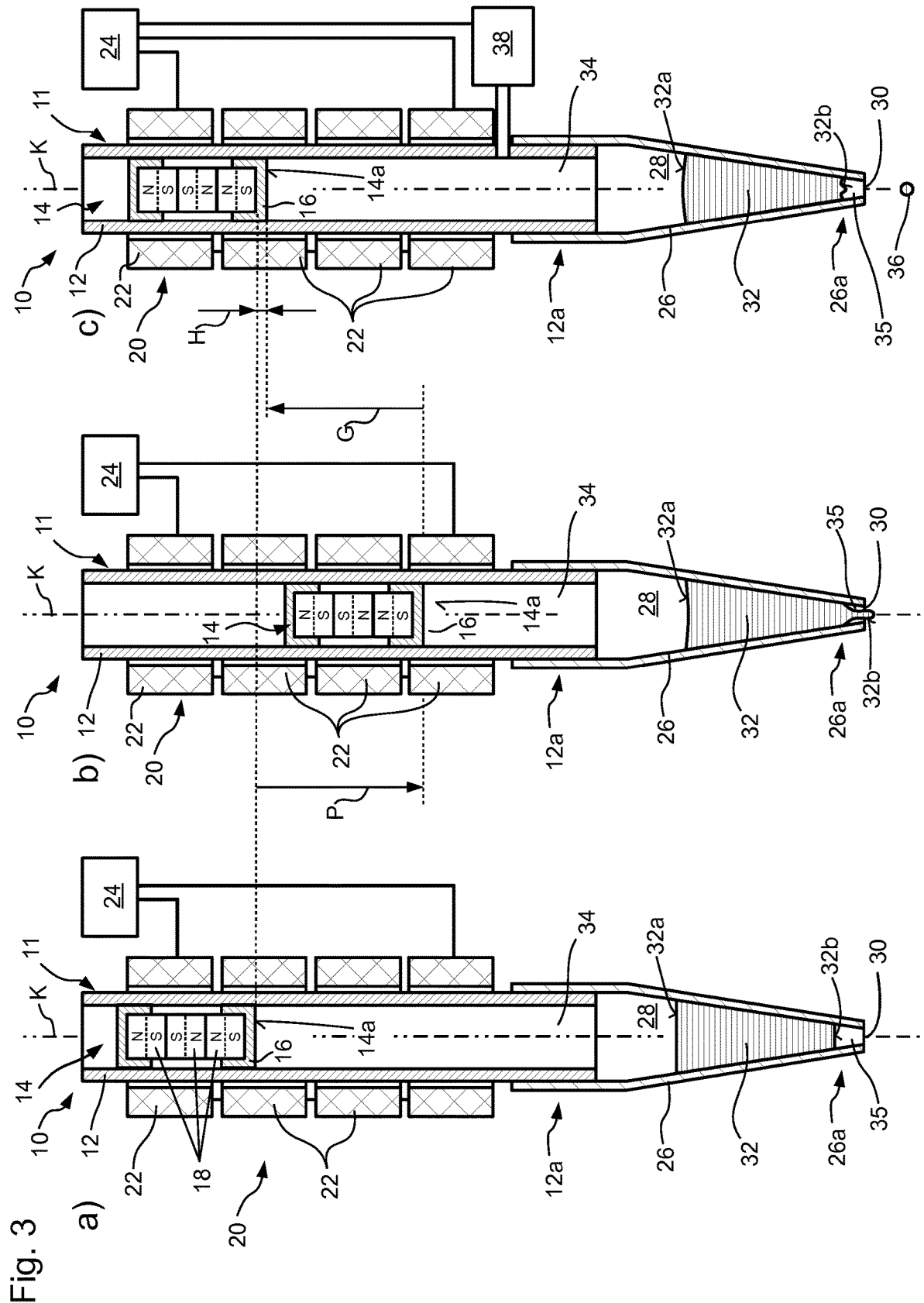
FIG. 3a shows the pipetting apparatus of FIG. 2c, depicted again on the third sheet of drawings merely in the interest of clarity.
FIG. 3b shows the pipetting apparatus of FIG. 3a during abrupt generation of an overpressure pulse.
FIG. 3c shows the pipetting apparatus of FIG. 3b after completion of the whip-like piston motion in order to dispense a individual metered volume of 450 nl.

In FIGS. 1 to 3c, a pipetting apparatus according to the present invention is labeled in general with the number 10. Said apparatus encompasses a pipetting conduit 11 encompassing a cylinder 12 that extends along a conduit axis K configured as a straight-line conduit axis. A piston 14 is received in this pipetting conduit 11, movably along conduit path K.

Piston 14 encompasses two end caps 16 (only the lower one being labeled with reference characters in FIGS. 1 to 3c in the interest of clarity) between which a plurality of permanent magnets 18 (in the present example, three permanent magnets 18) are received. In order to achieve a magnetic field that is selective along conduit path K, permanent magnets 18 are polarized along conduit axis K and arranged in pairs with like poles facing toward one another. What results from this arrangement is a magnetic field, proceeding from piston 14, which is very largely uniform around conduit axis K, i.e. substantially rotationally symmetrical with respect to conduit axis K, and exhibits a large gradient in magnetic field strength along conduit axis K, so that unlike polarization zones alternate selectively along conduit path K. It is thus possible, for example using Hall sensors (not depicted), to achieve high positional resolution in terms of detecting the position of piston 14 along conduit axis K, and very efficient coupling of an external magnetic field to piston 14 can be achieved.

End caps 16 are preferably constituted from a low-friction material encompassing graphite, as is known e.g. from commercially obtainable caps of the Airpot Corporation in Norwalk, Conn. (US). In order to allow the low friction furnished by this material to be exploited as completely as possible, pipetting conduit 11 preferably encompasses a cylinder made of glass, so that upon a motion of piston 14 along conduit axis K, the graphite-encompassing material slides with extremely little friction against a glass surface.

Piston 14 thus constitutes a rotor of a linear motor 20 whose stator is constituted by coils 22 (only four coils being depicted here by way of example) that surround pipetting conduit 11.

Be it noted explicitly that FIGS. 1 to 3c are merely schematic longitudinally sectioned views of a pipetting apparatus 10 according to the present invention, and are not in any way to be understood as being to scale. In addition, pluralities of components are depicted by way of an arbitrary number of components, for example three permanent magnets 18 and four coils 22. In actuality, both the number of permanent magnets 18 and the number of coils 22 can be greater or less than the number depicted.

Control is applied to linear motor 20, more precisely to its coils 22, by way of a control apparatus 24 that is connected to coils 22 in signal-transferring fashion. The transfer of electrical current in order to energize the coils, and thus to generate a magnetic field by way of them, is also considered a signal.

A pipetting tip 26 is detachably attached, in a manner known per se, at metering-side end 12a of cylinder 12. The connection of pipetting tip 26 to metering-side longitudinal end 12a of cylinder 12 is likewise depicted merely schematically.

Pipetting tip 26 defines in its interior a pipetting space 28 that is accessible, at longitudinal end 26a remote from the coupling, exclusively through a pipetting opening 30. While it is attached to cylinder 12, pipetting tip 26 prolongs pipetting conduit to pipette opening 30.

In the example of pipetting apparatus 10 depicted in FIG. 1, immediately after termination of a conventional aspiration operation in the quasi-synchronous pipetting mode, a quantity of metered liquid 32 is received in pipetting space 28 (and thus in pipetting apparatus 10) using the same pipetting apparatus 10.

Working gas 34 is permanently located between piston 14 and metered liquid 32, and serves as a force mediator between piston 14 and metered liquid 32. What is present between piston 14 and metered liquid 32 is preferably only working gas 34, if applicable negligibly modified in terms of its chemical composition due to the uptake of volatile constituents from metered liquid 32.

Working gas 34 is arranged between piston 34 and a metered liquid 32 even when pipetting tip 26 is completely empty, since pipetting tip 26 is immersed into a corresponding metered-liquid reservoir in order to aspirate metered liquid 32, so that in that state at least a meniscus of metered liquid 32 is present at pipetting opening 30. In any state of pipetting apparatus 10 which is relevant to a pipetting operation, working gas 34 is thus always and completely present between piston 14 and a metered liquid 32, and separates them from one another.

More precisely, working gas 34 is located between a metering-side end surface 14a of piston 14, which is constituted in the present example by an end surface of end cap 16 which faces toward metering opening 30 in an axial direction (with reference to conduit path K), and a pipetting-opening-distal meniscus 32a of metered liquid 32 that is received as a liquid column in pipetting space 28.

Proceeding from the state shown in FIG. 1, a preparation for a pulsed dispensing operation of pipetting apparatus 10 according to the present invention, and the pulsed dispensing operation itself, will be described below:

FIGS. 2a to 2c describe a preparation of pipetting apparatus 10 with which the accuracy of the pulsed dispensing operation depicted in FIGS. 3b to 3c can be considerably enhanced. This means substantially that smaller minimum dispensed doses can be delivered, with high reproducibility, than without corresponding preparation.

Proceeding from the state of pipetting apparatus 10 immediately after aspiration of the predetermined metered-liquid quantity 32 into pipetting tip 26 (see FIG. 1), control apparatus 24 energizes coils 22 in such a way that pipetting piston 14 is moved so as to generate a (first) negative pressure in working gas 34, i.e. is moved away from pipetting opening 30.

The result is that metered-liquid quantity 32 furnished in pipetting apparatus 10, more precisely in pipetting receiving space 28 of pipetting tip 26, becomes displaced along conduit axis K away from pipetting opening 30 into pipetting apparatus 10, more precisely into pipetting tip 26. Metered liquid 32 that is furnished is delimited toward pipetting piston 14 by a meniscus 32a farther from pipetting opening 30, and delimited toward pipetting opening 30 by a pipetting-opening-proximal meniscus 32b. The displacement of metered liquid 32 away from pipetting opening 30 results in formation of a gas volume 35 between pipetting opening 30 and pipetting-opening-proximal meniscus 32b.

For a metered-liquid quantity 32 that is assumed by way of example to be 40 µl, gas volume 35 immediately prior to triggering of the pulsed dispensing overpressure pulse is preferably 4 to 10 µl, particularly preferably 4 to 6 µl.

Meniscus 32b, which is present in an undefined shape, in particular with an undefined curvature, at pipetting opening 30 after aspiration, acquires a more strongly defined shape as a result of the displacement of meniscus 32b, which is closer to the pipetting opening and therefore delivers the subsequent metered droplet, away from pipetting opening 30. Although the shape of pipetting-opening-proximal meniscus 32b is not completely defined after the generation of gas volume 35 as shown in FIG. 2a, its shape nevertheless fluctuates to only a minor extent around a shape that is usually to be expected.

The shape of pipetting-opening-proximal meniscus 32b depends, for example, on the surface tension of metered liquid 32, on its density, on its viscosity, and on the wettability of the wall of pipetting tip 26.

As shown in FIG. 2b, control apparatus 24 can then drive coils 22 to move pipetting piston 14 so as to produce a pressure increase in working gas 34, i.e. to displace pipetting piston 14 toward pipetting opening 30. As a result, metered liquid 32 furnished in pipetting tip 26 becomes displaced back toward pipetting opening 30 but not beyond it. Gas volume 35 between pipetting opening 30 and pipetting-opening-proximal meniscus 32b thereby becomes smaller or in fact disappears entirely.

In addition, control apparatus 24 can drive coils 22 again to move pipetting piston 14 so as to decrease the pressure of working gas 34, i.e. to move it in an aspiration direction away from pipetting opening 30, with the result that a gas volume 35 between pipetting opening 30 and pipetting-opening-proximal meniscus 32b of metered liquid 32 is once again formed and/or enlarged. The result of the back-and-forth motion of metered liquid 32 in pipetting tip 26 as depicted in FIGS. 2a to 2c is that once generation of the second negative pressure as shown in FIG. 2c is complete, the meniscus 32b formed for a given metered liquid 32 is always of the same shape; this is advantageous for the subsequent pulsed dispensing operation as depicted and described in FIGS. 3a to 3c. The advantage lies in the reduction of the minimum dispensable liquid quantity, and the repeatability thereof achievable in the context of aliquoting.

FIG. 3a depicts pipetting apparatus 10 of FIG. 2c on a separate sheet of drawings in order to facilitate a comparison of the various states of pipetting apparatus 10 immediately before and during generation of an overpressure pulse.

The central point of the inventive idea of the present Application is a whip-like motion of piston 14. That whip-like motion is manifested in several ways.

Because of the preferred linear motor 20 that is furnished, piston 14 can be moved with enormous motion dynamics along conduit axis K. In order to dispense a small quantity of liquid, for example 0.5 µl of metered liquid 32, piston 14 is firstly moved rapidly toward metering opening 30 (in this case, in the dispensing direction) so as to generate a pressure elevation in working gas 34. Control apparatus 24 applies control to coils 22 of linear motor 20 in such a way that piston 14 executes a linear stroke P of sufficient length that metering-size end surface 14a of piston sweeps out along linear stroke P several times, for example 40 times, the predetermined individual metered volume 36 (see FIG. 3c). In the position shown in FIG. 3b, the piston is then located at the bottom dead-center point of its motion in a dispensing direction, whereupon piston 14 is driven to perform an oppositely directed motion in an aspiration direction, i.e. so as to reduce the pressure of working gas 34 (see arrow G).

The motion of piston 14 in a dispensing direction lasts less than 10 ms. When piston reaches its bottom dead-center point, no portion of metered liquid 32 has yet detached from pipetting tip 26. Pipetting-opening-proximal meniscus 32b is depicted in a shape that is preparatory for a droplet delivery. The shape of meniscus 32b is selected merely for explanatory purposes, in order to illustrate the fact that delivery of a metered-liquid droplet 36 (see FIG. 3c) is imminent. Pipetting-opening-distal meniscus 32a is shown with a concave curvature in order to depict the effect of the overpressure pulse on metered liquid 32.

The piston is moved in a dispensing direction, for example, at a maximum speed of approximately 10,000 µl/s, and accelerated and decelerated again for that purpose with an acceleration of up to $8\times10^6$ µl/s$^2$. The maximum speed occurs only briefly, however. This means that in the instance recited, in which its metering-side end surface 14a sweeps out a volume approximately 40 times that of individual metered volume 36, i.e. approximately 20 µl, in the course of the dispensing motion, the piston requires approximately 6 to 8 ms for that dispensing motion.

Metered liquid 32 is too sluggish here to follow that piston motion. Instead, a pressure elevation pulse is transferred from piston 14 via working gas 34 to metered liquid 32 in pipetting tip 26. Proceeding from what is depicted in FIG. 3b, piston 14 is then accelerated as immediately as possible back in an aspiration direction, motion stroke length G in an aspiration direction being, in the present case, shorter than linear stroke P of the motion in a dispensing direction, such that end-located piston surface 14a sweeps out, in the course of the motion in an aspiration direction, an aspirated volume that is smaller than the swept-out dispensed volume by an amount equal to individual metered volume 36.

This need not be the case, however. The aspirated volume can also be exactly the same size as the dispensed volume. An aspirated volume reduced by an amount equal to the individual metered volume 36 has the advantage, however, that the location of the pipetting-opening-proximal meniscus does not change after pipetting, which is advantageous especially in aliquoting mode.

In the final position of pipetting apparatus 10 as shown in FIG. 3c, after the end of the pulsed dispensing operation, metering-side end surface 14a is at a distance from the initial position of FIG. 3a which is equal to a resulting stroke length H; in the example depicted, the piston area of piston 14 multiplied by the resulting stroke length H corresponds to individual metered volume 36.

The motion in an aspiration direction also proceeds at the aforesaid maximum speed, so that this motion as well requires approximately 6 to 8 ms. With additional dwell times at the bottom dead-center point which can occur as a result of overcoming the static friction limit, and incorporating any motion overshoots of piston 14 which might occur around its target position, the entire piston motion to the point of reaching the final position shown in FIG. 3c occurs in approximately 14 to 30 ms.

It is only after the piston motion reverses from the aspiration direction into the dispensing direction that a defined individual metered volume 36 is ejected away from pipetting opening 30 in the form of a droplet. This droplet moves along the notionally prolonged conduit path K to a metering destination placed below pipetting opening 30, for example a container or a well. Pipetting-opening-proximal meniscus 32b can continue to reverberate briefly after metered-liquid droplet 36 is ejected.

Pipetting tip 26 can have a nominal pipetting space volume that substantially exceeds the individual metered volume, for example 200 to 400 µl, preferably 300 µl.

The motion of piston 14 in an aspiration direction in turn proceeds so quickly that a pressure reduction pulse is transferred from metering-side end surface 14a to metered liquid 32 in pipetting space 28.

The pressure elevation pulse of the piston motion in a dispensing direction constitutes the steep leading edge of an overpressure pulse whose steep trailing edge constitutes the pressure reduction pulse of the piston motion in an aspiration direction. The shorter the duration of the individual piston motion, the steeper the edge of the pressure modification pulse associated with it. The two pressure modification pulses acting in opposite directions can thus define a "hard" overpressure pulse having steep edges.

The impact of the "hard" overpressure pulse that is thereby formed produces the extremely precise, repeatable dispensing result.

Surprisingly, the dispensing operation presented here is independent of the size of the selected pipetting tip 26. The same piston motion as described above would produce exactly the same result even with a considerably smaller pipetting tip having, for example, a nominal pipetting space volume of 50 µl, provided the same working gas and the same metered liquid are used with no change in the dispensing parameters.

The present pipetting apparatus according to the present invention and the pulsed dispensing method presented according to the present invention are thus outstandingly suitable for aliquoting liquids even from large reservoirs of metered liquid 32 received in pipetting tips 26. Under otherwise identical conditions, the dispensing behavior of pipetting apparatus 10 does not change even over a large number of aliquoting cycles. The dispensing behavior of pipetting apparatus 10 according to the present invention is thus also independent of the fill level of a pipetting tip 26 attached to cylinder 12, as long as that tip is filled sufficiently for pulsed dispensing.

It is indicated in FIG. 3c that a pressure sensor 38 can detect the pressure in the interior of pipetting conduit 11, i.e. the pressure of working gas 34 between metered liquid 32 and metering-side end surface 14a of piston 14, and transfer it via a signal lead to control device 24. When correspondingly fast pressure sensors 38 are used it is even possible, for execution of a whip-like piston motion as presented above, to regulate the motion of the piston as a function of the pressure of working gas 34.

Because of inertia, the piston motion may possibly not follow with complete accuracy the control signal on which the motion is based. The piston may tend to overshoot at points of highly dynamic forces, namely upon reversal of the motion direction from the dispensing direction to the aspiration direction but also as the piston comes to a halt. The control signals on which the motion is based, which map a target motion, are therefore to be considered crucial in the event of doubt.

Figure 4:
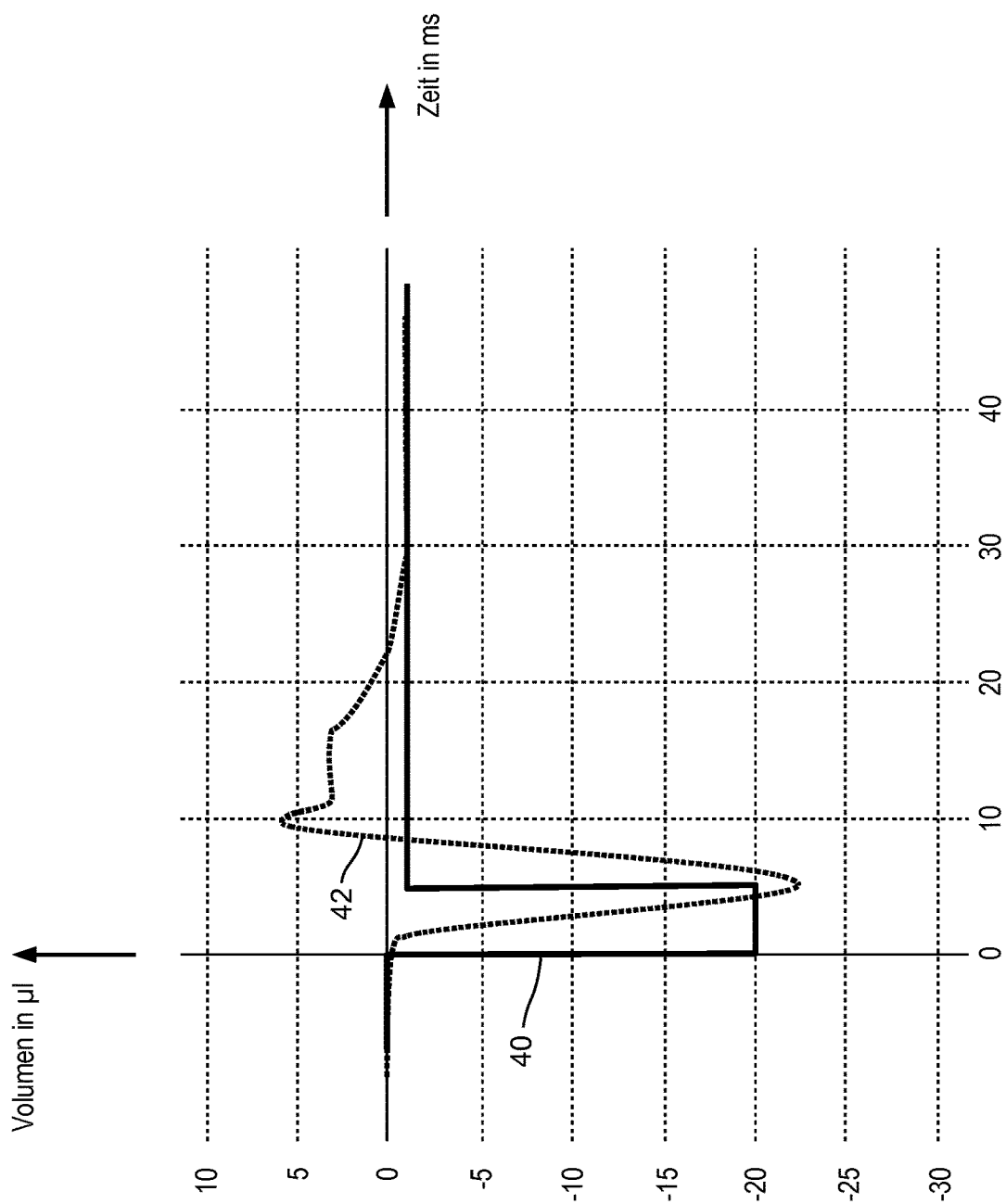
FIG. 4 shows schematic graphs of time courses of a control signal and of the piston motion produced thereby, in the pipetting operation of FIGS. 3a to 3c.

FIG. 4 schematically depicts, merely by way of example, a time course 40 of a control signal (solid line) and a time course 42 of the motion of piston 14 (dashed line), as they might exist in the context of a dispensing operation of FIGS. 3a to 3c.

The zero-point line selected in FIG. 4 is the current piston position at the beginning of the dispensing operation, i.e. the piston position shown in FIG. 3a.

The abscissa of the depiction of FIG. 4 shows time in milliseconds, a 10-ms grid having been selected.

The ordinate shows volume in microliters, the volume on the ordinate axis indicating, with reference to location/time curve 42 of piston 14, the volume swept out by metering-side end surface 14a of piston 14.

The control signal of graph 40 is an electrical signal, but it can be construed as a target location/time curve of piston 14 and can therefore also be indicated as a target volume, in microliters, swept out by metering-side end surface 14a of piston 14.

Control signal 40 is a square-wave signal that jumps at time t=0 ms from 0 to −20 μl, i.e. 40 times individual metered volume 36. The negative sign results from the direction of motion: a volume swept out upon motion of metering-side end surface 14a of piston 14 toward pipetting opening 30 (dispensed volume) is negative; a volume swept out upon motion away from the pipetting opening (aspirated volume) is positive. This sign convention applies both to control signal 40 and to the actual motion 42 of piston 14.

After 5 ms the square-wave control signal 40 jumps back to −0.5 μl, so that as described previously in connection with FIGS. 3a to 3c, control signal 40 indicates a target dispensed volume of 20 μl and a target aspirated volume of 19.5 μl that are to be swept out within 5 ms.

Piston 14 of course cannot exactly follow square-wave control signal 40, since a square-wave control signal would require an almost infinitely fast motion in order to follow the trailing edge (which indicates the dispensed volume) and the leading edge (which indicates the aspirated volume) of control signal 40.

Because of the frictional forces and inertia that must be overcome, and other additional influences such as the work to be performed on the working gas, piston 14 starts to move approximately 1 ms after the beginning of control signal at 0 ms but requires approximately a further 4 ms to arrive at its bottom dead-center point, at which piston 14 immediately reverses its direction of motion.

This means that piston 14 reaches its bottom dead-center point approximately when control signal 40 has jumped to its final value of −0.5 μl.

The piston motion can overshoot slightly in a pipetting direction due to inertia, so that metering-side end surface 14a can sweep out not only the −20 μl actually instructed by control signal 40, but in reality approximately −22.5 μl, until it reverses its direction of motion.

As is evident from curve 42 of FIG. 4, piston 14 reaches its destination position at approximately 8 ms, but overshoots considerably and does not in fact come to a halt in its target final position until approximately 29 ms after the start of the control signal.

Figure 5:
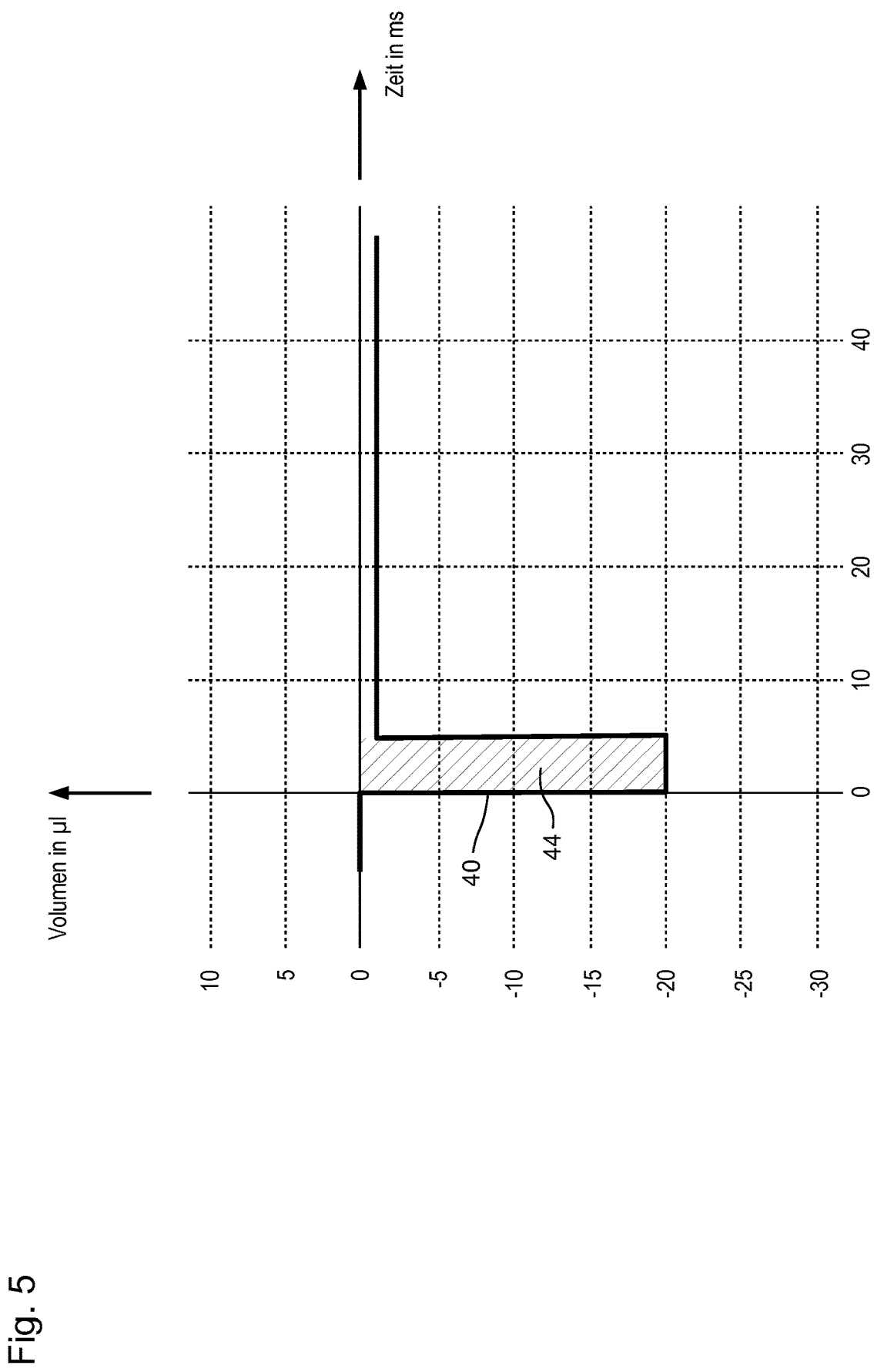
FIG. 5 shows what is depicted in FIG. 4, depicting only the control signal.

FIG. 5 again depicts (only) control signal curve 40. The integral of control signal 40 over the time from the beginning of the control signal (or control signal portion) that produces the piston motion in a dispensing direction to the end of the control signal (or control signal portion) that produces the piston motion in an aspiration direction, is an indication of the metered-liquid volume actually dispensed in the pulsed dispensing operation controlled in that manner. The integral thereby described corresponds to the area circumscribed by control signal 40 within the aforesaid time limits. That area is depicted with cross-hatching in FIG. 5, as area 44. The area extends to the zero line of the volume from which control signal 40 departed. It is therefore immaterial whether the control signal actually returns to the zero line or ends with a shift in a dispensing direction by an amount equal to individual metered volume 36.

The exact correlation between area 44 circumscribed by control signal 40 and the metered-liquid volume actually dispensed thereby can very easily be ascertained empirically for various classes of liquids, and stored in a data memory.

Figure 6:
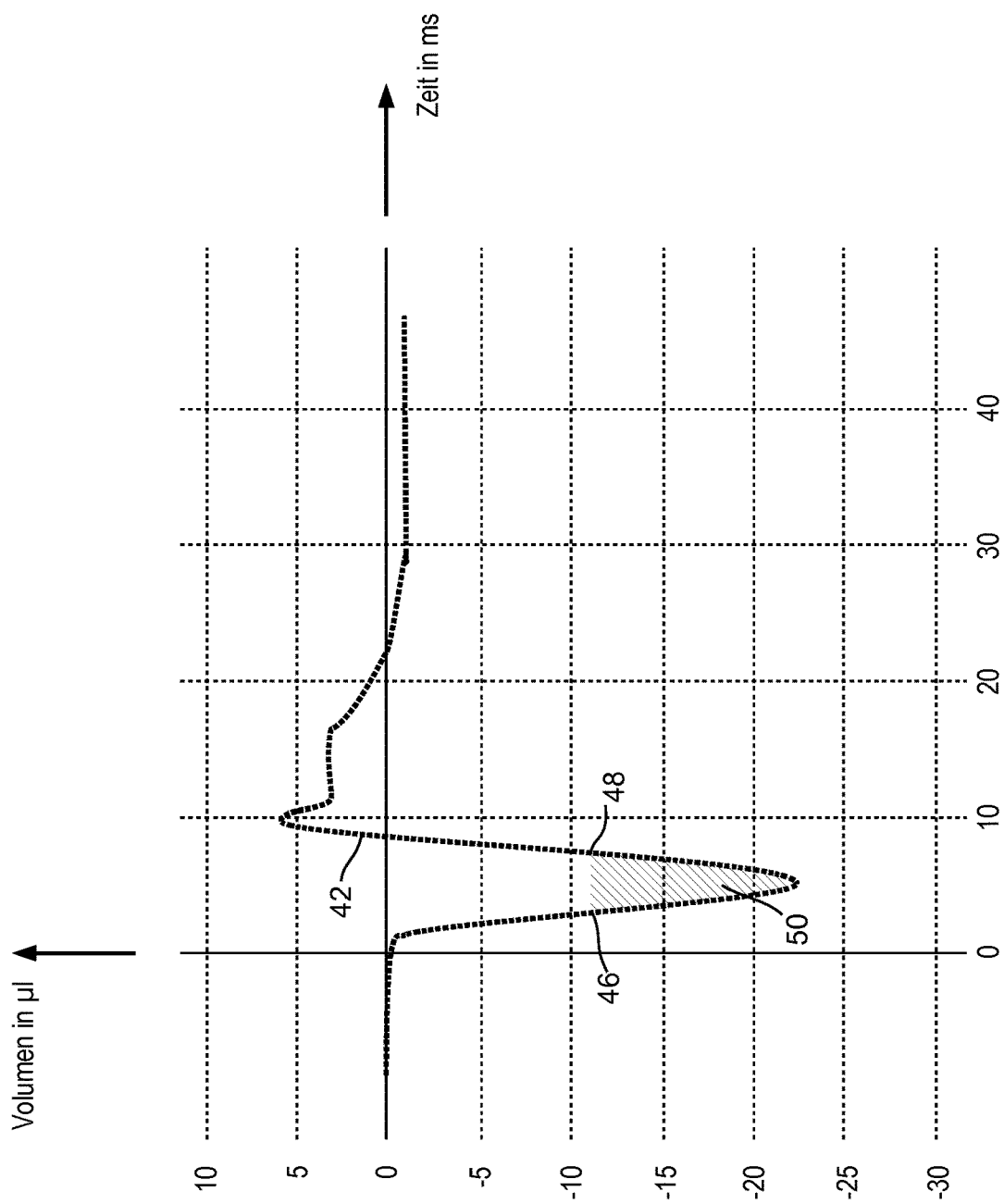
FIG. 6 shows what is depicted in FIG. 4, depicting only the location/time curve of the piston.

FIG. 6 depicts only location/time curve 42 of piston 14, without control curve 40. The numbers 46 and 48 indicate the location of the "half-travel distance" of piston 14 between its starting position at 0 μl and its motion direction reversal point at approximately −22.5 μl. The half-travel distance is thus located at approximately −11.25 μl.

The time integral of the location/time curve of piston 14—represented e.g. by the location/time curve of metering-side piston surface 14a constituting a reference point of piston 14—between passage through the location of the half-travel distance upon motion in a dispensing direction and passage through that location again during its motion in an aspiration direction, is an indication of individual metered volume 36 that is actually dispensed in pulsed fashion by the piston motion. An area constituted by that integral is depicted with cross-hatching in FIG. 6 as area 50. Like the planar area of area 44 of FIG. 5, the planar area of area 50 is an indication of individual metered volume 36 that is actually pipetted. The correlation between the planar area of area 50 and the actually pipetted individual metered volume 36 can, however, be different from that between the planar area of area 44 and individual metered volume 36. That correlation as well can easily be ascertained empirically for different classes of liquids, and stored in a data memory of the pipetting apparatus.

Very small individual metered volumes 36 of 1 μl or less can thus be dispensed in pulsed fashion with a very high degree of reproducibility, using the same pipetting apparatus 10 with which large pipetting volumes (more than 100 μl) can also be pipetted in a conventional quasi-synchronous pipetting mode.

The invention claimed is:
1. A pipetting apparatus for pulsed dispensing, with the intermediary of a variable-pressure working gas, of small metered-liquid doses of no more than 1 ul from a larger metered-liquid quantity furnished in the pipetting apparatus, the pipetting apparatus comprising:
 a pipetting conduit at least partly filled with working gas;
 a pressure-modifying apparatus comprising a pipetting piston for modifying the pressure of the working gas, wherein the working gas is accommodated between the pipetting piston and the metered-liquid quantity furnished in the pipetting apparatus; and
 a control apparatus for applying control to the pressure-modifying apparatus, the control apparatus being embodied to apply control to the pressure-modifying apparatus so as to generate in the pipetting conduit, with respect to a reference holding pressure in the pipetting conduit which is necessary for immovable holding of the metered-liquid quantity, an overpressure pulse having a pulse duration of no more than 40 ms, wherein the control apparatus is further embodied to apply control to the pressure modification apparatus, prior to generation of the overpressure pulse in the pipetting conduit with respect to the reference holding pressure, so as to generate a negative pressure.

2. The pipetting apparatus according to claim 1, wherein the control apparatus is embodied to apply control to the pressure modification apparatus, between the generation of two overpressure pulses that are each associated with a different one of two pulsed dispensing operations immediately successive to one another, so as to generate the reference holding pressure and then generate the negative pressure.

3. The pipetting apparatus according to claim 2, wherein generation of the negative pressure encompasses generation of a first negative pressure, then generation of a pressure having a greater magnitude than the first negative pressure, and then generation of a second negative pressure.

4. The pipetting apparatus according to claim 1, wherein the control apparatus is embodied to apply control to the pressure modifying apparatus, after generation of the negative pressure and before generation of the overpressure pulse, so as to generate the reference holding pressure.

5. The pipetting apparatus according to claim 1, further comprising a pressure sensor for detecting the pressure of the working gas, the pressure sensor being connected in signal transferring fashion to the control apparatus for transfer of its detected information, the control apparatus applying control to the pressure modification apparatus in accordance with the information detected by the pressure sensor.

6. A method for pulsed dispensing from a pipetting tip, at a dispensed volume of no more than 1 ul for a single dispensing operation, of metered liquid received in the pipetting tip, comprising the step of:
  generating an overpressure pulse in a working gas that is connected in pressure transferring fashion to the received metered liquid on a side facing away from a pipetting opening of a pipetting apparatus, so as thereby to detach a liquid droplet, on the side of the metered liquid facing toward the pipetting opening, from the latter and accelerate it away from the metered liquid,
  wherein the method encompasses, before generation of the overpressure pulse, the following step:
  with respect to a reference holding pressure in the pipetting conduit which is necessary for immovable holding of the metered-liquid quantity, generating a negative pressure in the working gas and thereby moving the received metered liquid away from the pipetting opening, accompanied by formation or enlargement of a gas volume between the metered liquid and the pipetting opening.

7. The method according to claim 6, further comprising, after generation of the negative pressure but before generation of the overpressure pulse, the following step:
  elevating the pressure in the working gas and thereby moving the received metered liquid toward the pipetting opening.

8. The method according to claim 7, further comprising, after elevation of the pressure in the working gas but before generation of the pressure pulse, the following steps:
  with respect to the reference holding pressure, generating a negative pressure in the working gas and thereby moving the received metered liquid away from the pipetting opening, accompanied by formation of a gas volume between the metered liquid and the pipetting opening.

9. The pipetting apparatus according to claim 1, wherein the pressure modifying apparatus comprises two different working-gas pressure reservoirs, one at negative pressure and one at overpressure with respect to a reference pressure, each of the working-gas pressure reservoirs being connectable in pressure-transferring fashion to the pipetting conduit;
  wherein the control apparatus is embodied to control an opening and a closing of valves, to control generation of a negative pressure encompassing an opening and a closing of a negative-pressure valve, and to control generation of an overpressure pulse encompassing an opening and a closing of the negative-pressure valve and an opening and a closing of an overpressure valve.

* * * * *